United States Patent [19]
Tarel
[11] 3,806,656
[45] Apr. 23, 1974

[54] DECOMMUTATION DEVICE IN USE, IN PARTICULAR IN A TRANSMISSION LINK WITH A MISSILE

[75] Inventor: Gérard René Joseph Tarel, Toulouse, France
[73] Assignee: Centre National D'Etudes Spatiales, Paris, France

[22] Filed: Dec. 1, 1972
[21] Appl. No.: 311,158

[30] Foreign Application Priority Data
Dec. 3, 1971 France ............................ 71.43472

[52] U.S. Cl. ............................ 179/15 BS, 325/325
[51] Int. Cl. ............................ H04j 3/06
[58] Field of Search ......... 179/15 BS, 15 BM, 15 A, 179/15 AP; 178/69.5 R; 325/30, 39, 40, 44, 325

[56] References Cited
UNITED STATES PATENTS

| | | | |
|---|---|---|---|
| 3,575,554 | 4/1971 | Schmidt | 325/325 |
| 3,701,894 | 10/1972 | Low | 325/325 |
| 3,735,045 | 5/1973 | Clark | 179/15 BS |
| 3,737,578 | 6/1973 | Matsuo | 325/30 |

*Primary Examiner*—Ralph D. Blakeslee
*Attorney, Agent, or Firm*—A. W. Breiner

[57] ABSTRACT

A device for the decommutation of messages, which device extracts data in a digitalized form by controlling a bits detector, without having available any external clock signals. The device comprises, for this purpose, at least one phase comparator including a pair of chains which are fed in parallel by a message, each of said chains comprising, in series, an integrator and a non-linear element, and the integrators each functioning for a duration which is equal to one clock period with partial overlapping of these durations, and the phase comparator comprises commutation means controlled by locally recreated clock signals and functions at a frequency which is a sub-multiple of that of the clock signals, for the purpose of taking out the signals, which are formed by integrators in an interval of time comprising a whole number of clock periods and are stored for a succeeding and equal interval of time, with a view to producing by differentiation error signals controlling an oscillator, which generates the local clock signals, acting on the phase comparator and the bits detector.

11 Claims, 19 Drawing Figures

DECOMMUTATION DEVICE IN USE, IN PARTICULAR IN A TRANSMISSION LINK WITH A MISSILE

BACKGROUND OF THE INVENTION

The present invention, which concerns radio communications technology, relates more particularly to a device for the decommutation of a random message of the PCM type, supplemented by thermal noise, which device extracts the data in a digitalized form, by controlling what is known as a "bits detector," it being assumed that no local clock is available and that, in order to be able to effect decommutation, the local clock signals must be recreated from the message received.

A situation of this kind is encountered, for example, when it is desired to establish means of telecommunication between various space vehicles and the ground; more particular reference may be made to this below, but it should be clearly understood that the invention should not be limited to this and that it may also be applied to telephony by coded pulses, to links between computers, to television and, generally, to any system comprising a remote link with the aid of a message, the spectrum of frequencies of which does not comprise any line which corresponds to synchronization signals.

Before going any further, it may be useful to recall to mind a number of conventional definitions, together with the meaning attributed to them here.

PCM (pulse code modulation) is a method of multiplexing in time which is used in digital communications systems to transmit a large quantity of items of information serially. On transmission, a commutator checks the sources of information, each analogical quantity corresponding to a multiplex channel is converted, by an analogical/digital converter, into a binary value, which is itself represented by a sequence of successive pulses, each having two levels, 0 or 1, which are called "bits." Each channel of signals to be transmitted is coded into binary code in order to make up "words" and the PCM message transmitted is constituted by a series of words.

It is clearly stated here that the decommutation device according to the invention is a synchronizer which is described as a "primary" synchronizer, that is to say it serves to extract the data bits, which have a random nature, and not to extract the words.

In PCM telecommunications, various codes are used as a support for the binary data:

In the code known as NRZ (or "non-return to zero," which itself may have a number of variant forms), the whole period of the bit constitutes the support for the data. For example, in the code known as NRZ-L, a 1 is represented by a first level (high) and a zero by a second level (low), and a transition is obtained each time the bit changes state (from 0 to 1 or from 1 to 0).

In the two-phase code (also called "split phase"), the data is represented by a transition in the middle of the period of the bit. This code also has a number of variants.

Equiprobable binary messages transmitted using NRZ and two-phase codes do not have, in their spectrum of frequencies, a discrete line at the frequency of the digital clock rhythm.

As for "PSK" (phase shift keying), this is a method of modulating a phase having a suppressed carrier (or subcarrier), by means of a random message coded in NRZ. By way of illustration, FIG. 1 of the accompanying drawings represents, on the line *a*, the binary message 1 0 0 1 0 1 coded in NRZ and, on the opposite lines *b* and *c*, the wave modulated in PSK (square or sine), assuming, as an example, there there are two complete undulations per bit.

On receiving a PCM input message accompanied by noise, the decommutation device according to the invention fulfils the following two functions:

1. it generates a local clock signal in synchronism with the input message;

2. it restores (by using the clock signal) the PCM train transmitted in the presence of noise.

In the particular case of the invention, it has been found that the rate of error in this restoration is practically the minimum rate which is theoretically possible.

There are already numerous systems, which have been described in theory or even put into practice, in which use is made, for the goal aimed at here (functions (1) and (2) above), of a synchronizer device in which a cross-correlation is carried out on the input signal with the aid of locally created clock signals, this cross-correlation being followed, for this purpose, by a non-linear processing operation. The device of the invention also functions in this way, while at the same time dispensing with the disadvantages of the existing devices.

Reference will be made again later on to the numerous special advantages offered by the device of the invention over the prior art. However, it is important to emphasize, even at this stage, that a device according to the invention may be set up to process the message in an analogical or digital manner, with a code of the NRZ or two-phase type or in PSK, while still retaining the same basic structure. This is not true of the devices previously known, which each function with only one particular pattern of signals, for example signals in digital NRZ form.

Moreover, these known devices may be classified into two categories:

- on the one hand, those described as a theoretical arrangement, which do not correspond to any effective practical embodiment; they lack the details necessary to assess their value and to enable a valid comparison to be made with the device of the invention;
- on the other hand, those which have been effectively put into practice.

It is found that the latter are heavy and complex and that there are no relatively light and simple ones having an efficiency approaching the maximum which is theoretically possible.

Now in the case of a space vehicle, in particular, it is particularly important that the "on-board" decommutator should be as light and reliable as possible, and that it should have a high degree of efficiency. It is therefore possible to see the considerable advantage of the invention for reaching these objectives.

Now it was found that it was possible to utilize a structure of general application, which is relatively simple and light, has a high degree of efficiency and offers a number of advantages over the previous devices, which fact indicates a major technical advance.

However, some of the previous devices will first be mentioned below, in order to highlight their differences vis-a-vis the invention.

Mention will first be made of the phase-locking loop described by A. J. Viterbi("Principles of coherent communication," published by McGraw Hill). However, this involves the principle of a synchronizer operating with a line which is included in the spectrum of the input signals. Even if the result is similar to that supplied by the invention, the basis of operation can only be different, since this line does not have to be recreated locally.

Also known is the device described by Mengali, "I.E.E. Transactions on aerospace and electronic systems", July 1971, pp. 686 et seq., and in particular FIG. 1. The message is applied to two chains connected in parallel and including integrators, via two multipliers on which the signals originating from the combination of the said two chains act via a number of means which are connected in series and include a loop filter and a voltage-controlled clock. This device appears to have certain structural features in common with the device of the invention; however, it functions in a very different manner. It depends, in particular, upon the existence of a Th element in one of the chains and seems intended to function under NRZ or two-phase digital conditions; it does not comprise any means for eliminating the ambiguity of phase of the output signals.

In order to present a more complete picture, there will also be mentioned, as having apparent structural similarities such that it may be taken for the basis of the known prior art, the PSK demodulator set forth in FIG. 4 of NASA "Technical report 32–1314", Jet propulsion laboratory, Aug. 1, 1968, page 3. This is found to comprise a phase comparator or equivalent means having two chains which are fed in parallel by the message, each of the said chains comprising, inseries, an integrator ("early integrator," "late integrator") and a nonlinear element of the absolute value type ("bit timing loop") which controls the clock signals via a clock oscillator which is monitored in respect of voltage. The "bit timing loop" device only functions under NRZ digital conditions. Moreover, it also requires a phase loop for acquiring the rhythm of the Costas loop-type subcarrier, which means that the unit is complex and specific to produce.

In this last, NASA device, it should also be observed, as an analogy with the invention, that the two integrators function on parts of a period which are different but are such that there is partial overlapping between these parts of a period: the so-called "early" integrator integrates from $tn + (T/3)$ to $tn + (4T/3)$, and the so-called "late" integrator from $tn + (2T/3)$ to $tn + (5T/3)$ (i.e., with an overlap of $(2T/3)$. By analogy, the chains in the device of the invention in which integrators which are, to some extent, similar, are located, will be called chain E (early) and chain (L) late.

SUMMARY OF THE INVENTION

In order to take account of the apparent structural analogy with this latter, known device, it may be said that the invention has as its object to provide a device for the decommutation of a random message of the PCM type, supplemented by noise of a thermal origin, which device extracts the data in digitalized form by controlling a bits detector, without having available external clock signals, the said device particularly comprising, for this purpose, at least one phase comparator or equivalent means, including a pair of chains which are fed in parallel by the message, while each of these chains comprises, in series, an integrator and a nonlinear element and the integrators each function for a duration which is equal to one clock period, with partial overlapping of these durations, but that, in order to attain the objectives and advantages aimed at, the phase comparator of the said decommutation device comprises commutation means controlled by locally recreated clock signals and functioning at a frequency which is a sub-multiple of that of the said clock signals, for the purpose of taking out the signals, which are formed by the integrators in an interval of time comprising a whole number of clock periods, and are stored for a succeeding and equal interval of time, with a view to producing by differentiation, as is known per se, error signals controlling an oscillator, which generates the said local clock signals, acting upon the phase comparator and the bits detector.

It will be seen that, in order to achieve the storage of the data signals and the flowing thereof without discontinuity, it is advantageous, according to a preferred embodiment of the invention, to use not one pair of chains but two pairs of chains which are commutated alternately in such a way that one functions as a memory while the other serves to create error signals for bringing the oscillator back into phase. There will thus have been produced a single phase comparator — that is to say it is not necessary to have an auxiliary phase loop for acquiring the rhythm of the sub-carrier — which can function under PSK conditions.

BRIEF DESCRIPTION OF THE DRAWINGS

The invention will now be further described, by way of example, with reference to the accompanying drawings, in which, apart from FIG. 1 which has already been mentioned.

DESCRIPTION OF PREFERRED EMBODIMENTS

The decommutation device of the invention (or the various devices which are possible, according to the methods of embodiment) therefore has the object of obtaining the acquisition of the frequency or "rhythm" of the bits — which will be assumed to be 1,000 Hz in order to provide a fixed basis for consideration — with a view to restoring the bits which make up the data.

Figure 2:
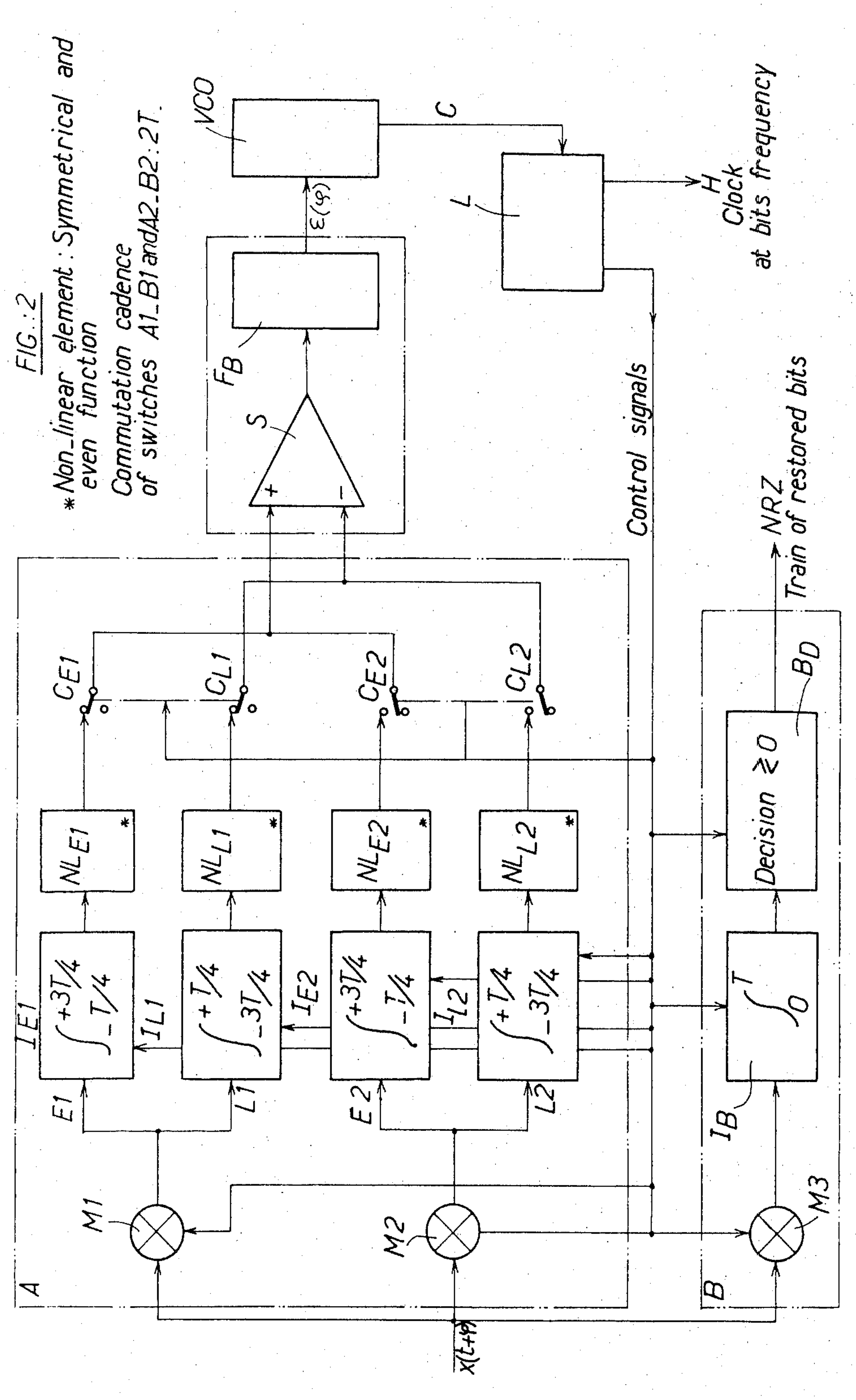
FIG. 2 is a block diagram of the basic arrangement of the device according to the invention.

FIG. 2 shows the block diagram of the basic arrangement of this device. In this diagram there will be found two parts marked A and B, and a chain marked C.

The part marked B is the bits detection device, which is known per se.

The part marked A forms, in conjunction with the chain C, the loop with phase locking for the acquisition of the sub-carrier. In part A, which constitutes a phase comparator, there will be found four chains $E_1$, $L_1$, $E_2$, $L_2$ which are fed in parallel by a message $x\ (t + \phi)$, via multipliers $M_1$, $M_2$; each multiplier feeding a pair of chains.

Each of the said chains comprises, in series, an integrating element $IE_1$ (or $IL_1$, $IE_2$, $IL_2$), a non-linear element $NL_{E1}$ (or $NL_{L1}$, $NL_{E2}$, $NL_{L2}$) and a commutating element $C_{E1}$ (or $C_{L1}$, $C_{E2}$, $C_{L2}$). Each integrating element works in two intervals of time. In a first time interval, it integrates the signals received and, in a second, it stores the data thus constituted; the latter are extracted, via the nonlinear element and the commutating element, in order to prepare an error signal.

It is appropriate to embark upon a digression at this point, in order to state that the device of the invention is fairly general in definition, and is embodied in different ways, according to whether processing is carried out therein in analogical or numerical form. If the processing is analogical, the integrators $IE_1$, etc., and the non-linear elements $NL_{E1}$, etc., are specific means which are known as such under analogical conditions; if, on the other hand, the processing is digital, $I_{E1}$, etc., designate summing devices and $NL_{E1}$, etc., designate elements of the module type.

Figure 1:
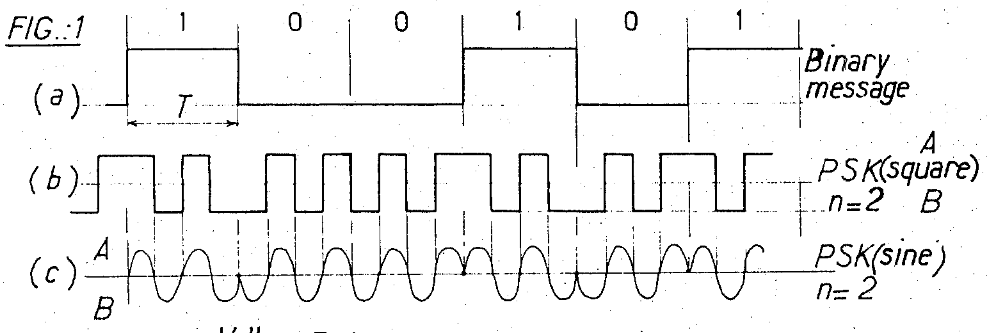
Figure 3:
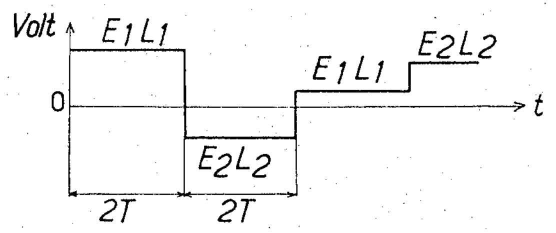
FIG. 3 shows the shape of the error signal, in terms of time.
Figure 4:
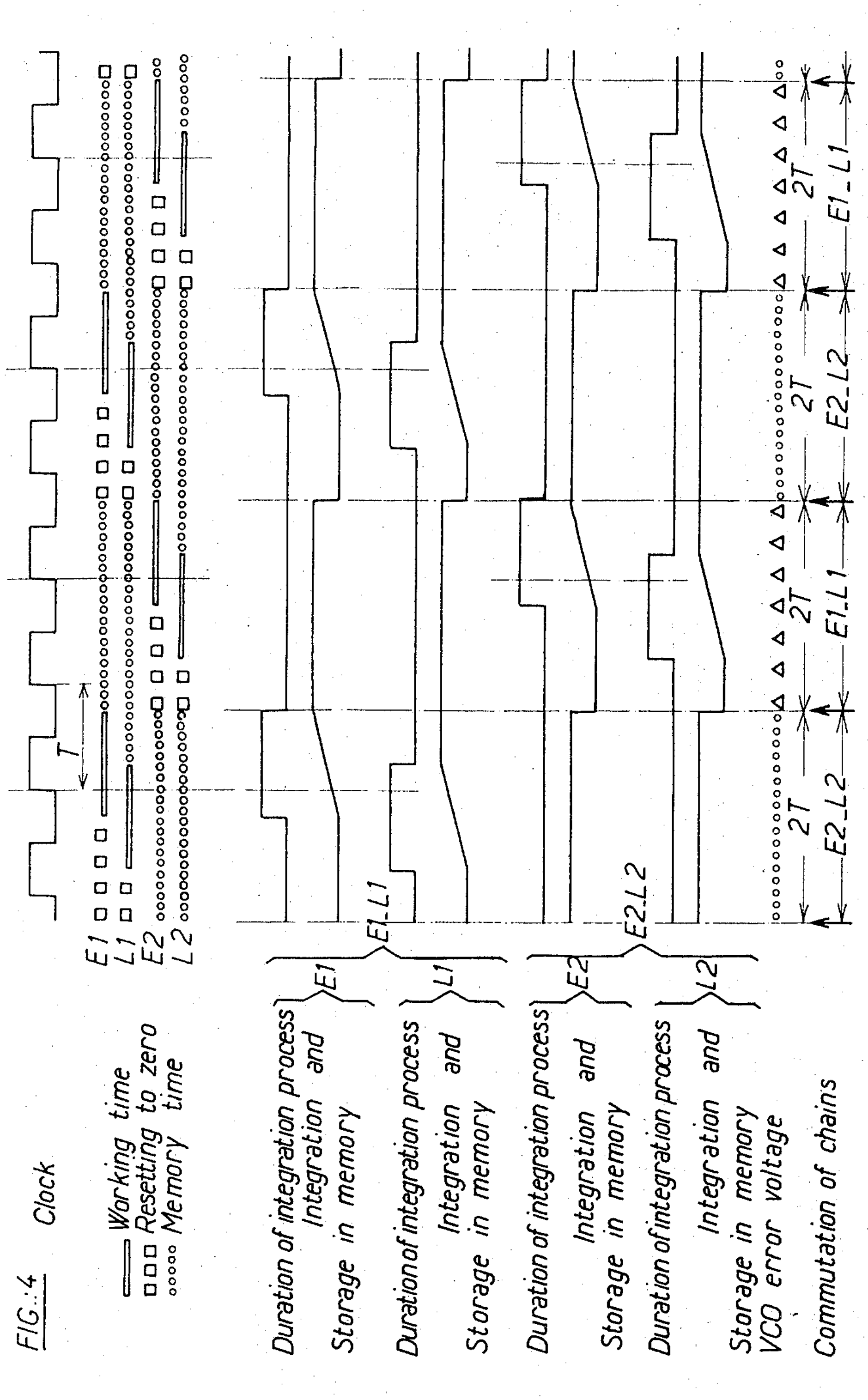
FIG. 4 is a chart of the times of the elements in the device shown in FIG. 2.

The arrangement in this device is such that, on the one hand, the integration times of a pair of associated chains overlap partially ($-T/4$ to $+ 3T/4$ in the case of $I_{E1}$ or $I_{E2}$, and $- 3\ T/4$ to $+ T/4$ in the case of $I_{L1}$ or $I_{L2}$, T being a complete period of the bit frequency (or of the sub-carrier frequency — in the case of PSK) and, on the other hand, each pair functions alternately, that is to say, while integration is being carried out in one pair, the other stores the data and then transmits the signal. This result is obtained because of the manner in which commutation is controlled. FIG. 3 supplies the shape of the error signal, and FIG. 4 the chart of the times.

It will be seen that each of the above-mentioned intervals has a value of $2T$. Commutation from one pair of chains to the other is effected every $2T$, that is to say, the error signal is taken from each chain every $4T$ (at the moment at which the corresponding integrator is reset to zero). It will also be noted that resetting to zero is effected at the beginning of a $2T$ interval, before integration occurs.

Figure 5:
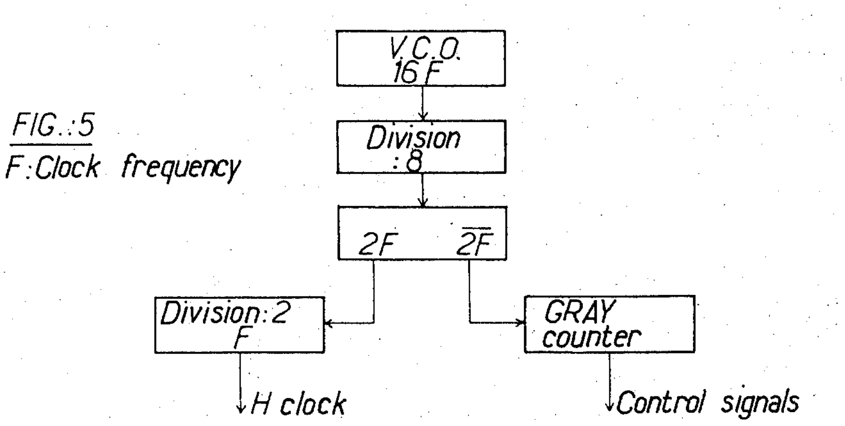
FIG. 5 is a block diagram of the logic used in the device shown in FIG. 2.

Following the phase comparator, there is located the chain C which comprises, in series, a summing device S, which has the purpose of performing differentiation between the error signals produced in chains E and L, and is followed by a loop filter $F_B$. The signal emerging from the filter (mean error signal $\epsilon(\phi)$) actuates a local oscillator VCO, controlled in respect of voltage, the frequency of which is, for example, 16 times the frequency of the bits. After passing through a logic L which has a scale of divisions and the diagram of which is given in FIG. 5, the signals from the oscillator actuate the multipliers, integrators and commutators of the phase comparator, and also the three main means in the part B of the decommutator, namely: a multiplier $M_3$, an integrator $I_B$ and a "decision" rocker $B_D$. The restored bits of the data are obtained at the output of the latter.

Here, the bits are detected in a coherent manner in NRZ code, with a probability of error which is a function of:

$N_o$, the density of the noise in terms of power;

$T$, the period of the bits;

$P$, the power of the signal received;

$E$, the energy of the bit.

The functioning of the phase comparator will now be explained with reference to FIG. 6, which shows a single pair of chains.

The input signal $x\ (t + \phi)$ is multiplied, in $M_E$, by a local clock signal $s_o\ (t + T/4)$ on the chain E, and in $M_L$, by a local clock signal $s_o\ (t + 3T/4)$ on the chain L.

The products are then integrated for elementary periods $T$ which are respectively out of phase, relative to the phase of the clock, by:

$- T/4$ (= early) in the chain E;

$+ T/4$ ( = late) in the chain L.

A non-linear device (having a characteristic of $y = x^n$) rectifies the output signal. Here it has been assumed that $n = 2$; this value is a close approximation to the transfer characteristic according to the diagram in FIG. 16 (see below) with a low signal/noise ratio; this also facilitates the calculations.

The error signal $\epsilon\ (\phi)$ which controls the VCO is constituted by the difference between the error signals generated by the two chains E and L.

It can be seen that, in the absence of noise, $\epsilon\ (\phi) = 0$ when there is no modification of the bit, and when there is such modification, $\epsilon\ (\phi)$ is proportional to the difference in phase between the local clock signal and the signal received.

Figure 7:
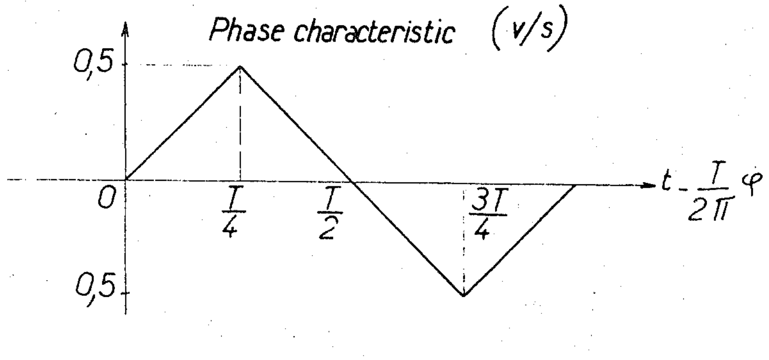
FIG. 7 shows the phase characteristic.

There is no ambiguity on the acquisition of the phase, as is clear from the characteristic curve (see FIG. 7) giving the mean value of the signal $\epsilon\ (\phi)$ as a function of the phase obtained.

Figure 6:
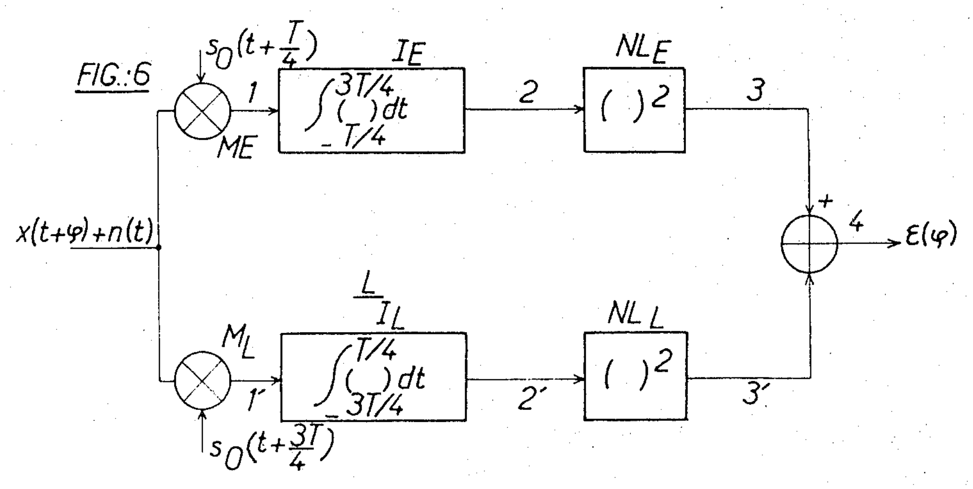
FIG. 6 is a diagram showing the principle of a pair of chains for the exposition of the invention.

The expression of the signals at the various points 1, 2, 3 and 4 marked in FIG. 6, is as follows:

at 1. $\mu_1(t + \phi_1) - x\ (t + \phi)\cdot S_o[(t + (T/4)]$;

at 2.

$$\alpha_1(t+\xi_1)=\int_{-\frac{T}{4}}^{+\frac{3T}{4}}\mu(t+\phi_1)dt;$$

at 3. $\alpha_1^2(t + \xi_1)$;

in which $\phi$, $\phi_1$ and $\xi_1$ are phase angles; (and similar formulae are obtained, with the index 2 instead of 1, at the points 1', 2', 3').

at 4. $\epsilon(\phi) = \alpha_1^2\ (t + \xi_1) - \alpha_2^2\ (t + \xi_2)$.

As for the noise, which has, at the input, the expression $n(t)$, an additional, equivalent noise $N\phi(t)$ is found which has a power density spectrum $S\ (\omega,\phi)$ which is substantially linear in the vicinity of the point of stable locking ($\omega \sim 0,\phi \sim 0$).

The theoretical considerations of Viterbi and Tausworthe may be applied to an equivalent loop comprising a loop filter of the second order having a transfer function $F(p) = 1 + T_{2p}/1 + T_{1p}$, where $T_{1p}$ and $T_{2p}$ are time constants.

Figure 8:
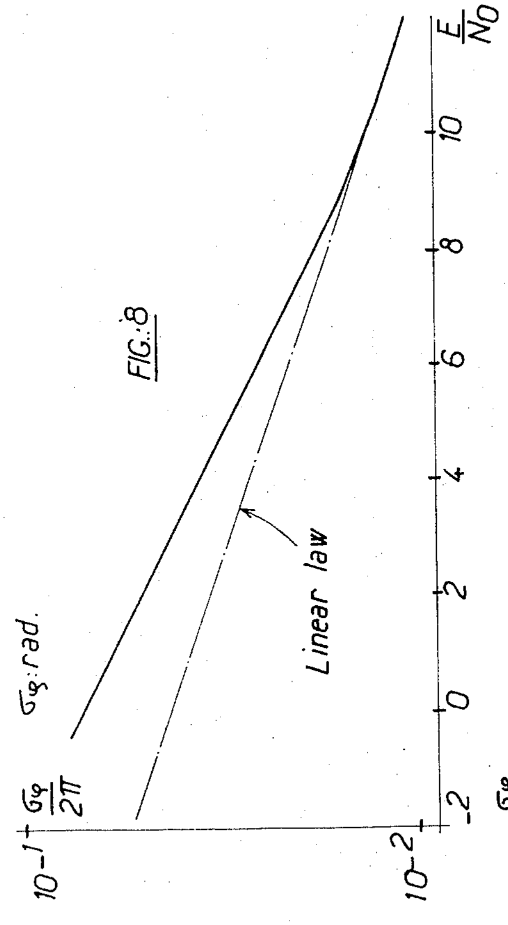
FIG. 8 gives the theoretical variation of $\sigma\psi/2\pi$ as a function of $E/N_o$, the parameter $\beta$ being selected, in the figure, as equal to $\beta = 4/\pi^2$.

In the case of a synchronization device of the squaring loop type, as described by A. J. Viterbi (see the reference above), the phase variance may be written:

$$\sigma 2/\phi = (N_o B_L/\beta P)\ [(1+(\beta N_o/PT)] \quad (1)$$

where $\beta$ is a coefficient such that:

$\beta = 4/\pi 2$ for a loop of the square/square type, that is to say $S_o(t)$ and $x(t+\phi)$ are square signals, $\beta = 1$ for a loop of the sine/sine type, in which $S_o(t)$ and $x(t+\phi)$ are sinusoidal signals;

and where $B_L$ is the band width of the equivalent loop. FIG. 8 supplies the curve of the variation of $\sigma\phi/2\,\pi$ as a function of $E/N_o$ for $B_L = 30$ Hz.

Under these circumstances, it may be written that the phase acquisition time is $t\phi \approx 6.9/2B_L$ with $\xi = 0.707$, an approximation which is justifiable when $B_L >> 1/T$ or $t_f \approx [4.2(\Delta f)^2/B_L^3]$ in seconds, for the synchronization frequency acquisition time under the same circumstances.

In order to obtain error signal samples which are distributed in a suitable manner, there are provided, as indicated in FIG. 2, two pairs of two parallel chains functioning alternately. This solution is also advantageous because four chains of identical construction are obtained, which simplifies manufacture.

However, it should be understood that it is not absolutely essential to have four chains, and that it is possible to make do with only two chains by providing a storage memory in association with each integrator, in order to enable the latter to effect integration and then be reset to zero, in each of the successive $2T$ intervals. Nevertheless, it is considered preferable, in the invention, to dispose four chains as indicated in FIG. 2, and it is this type of embodiment which will be considered in the rest of the description.

It will be assumed, for example, that the nonlinear elements are diodes, of which one is disposed in one direction in the chain E, and the other in the opposite direction in the chain L, and that the transfer characteristic in respect of voltage of the diode associated with its load circuit is quadratic and unilateral. If $V_1$ designates the (integrated) voltage at the input of the diode, in the chain E, and $V_2$ in the chain L, the following table may be formed (in the case of only two chains):

| | Error signal $\epsilon$ ($\phi$) |
|---|---|
| 1st case $V_1 > O$ $V_2 > O$ | $\epsilon = V_1^2$ |
| 2nd case $V_1 > O$ $V_2 < O$ | $\epsilon = V_1^2 - V_2^2$ |
| 3rd case $V_1 < O$ $V_2 > O$ | $\epsilon = O$ |
| 4th case $V_1 < O$ $V_2 < O$ | $\epsilon = -V_2^2$ |

It will be seen that, overall, a mean value of $\epsilon(\phi)$ is obtained which is equal to $V_1^2 - V_2^2$, as far as the data are concerned, whereas the noise provides a contribution which leads, in this case, to a degradation of 3 dB in the phase variance, remembering that it is a "non-correlated" function in a time interval $2T$. This is why, in order to carry out variance measurements, the following expression will be adopted for the phase variance:

$$\sigma^2 = (2\ N_o B_L/\beta P)\ [1 + (\beta N_o/PT)] \quad (2)$$

which is to be compared with expression (1).

This result, which is advantageous compared with the known device, is above all due to the simplicity of the structure of the phase comparator according to the invention.

Tests and measurements were carried out on an item of equipment produced with a structure of this kind. The input signal was a two-phase square signal, of amplitude 1V between peaks and $s_o(t)$, local clock signal of the square, $\approx 5$ V type. Modulation in PCM made it possible to pass a length of 511 bits with a sub-carrier rhythm of 1 kHz.

The characteristics of the loop were as follows:

damping ratio $\xi = 1.4$ inherent frequency $\omega_n = 28$ gain with loop open $K = 10^3$ band width of noise $2B_L = 30$ Hz VCO gain = 164 Hz/V.

Figure 10:
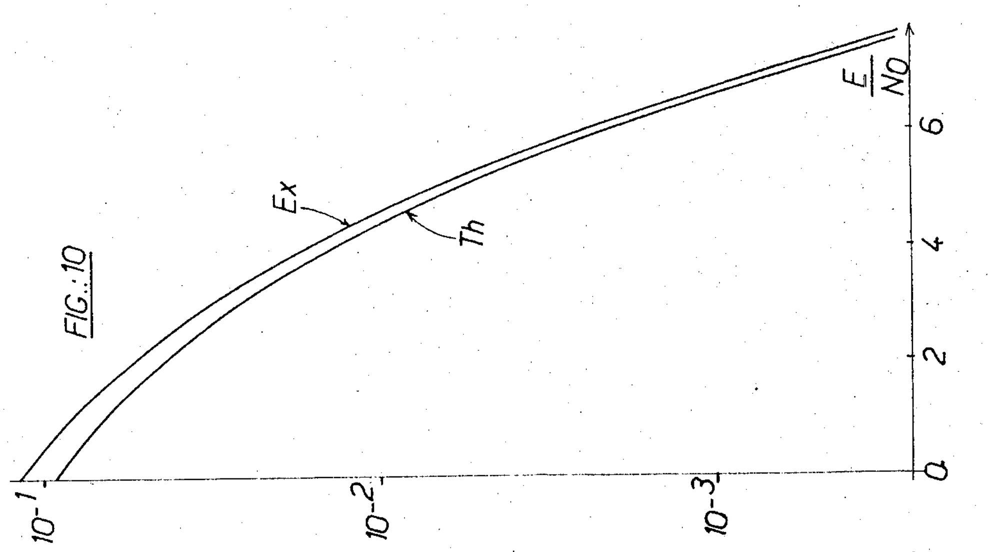
FIG. 10 gives probability curves for the experimental and theoretical bit error.
Figure 9:
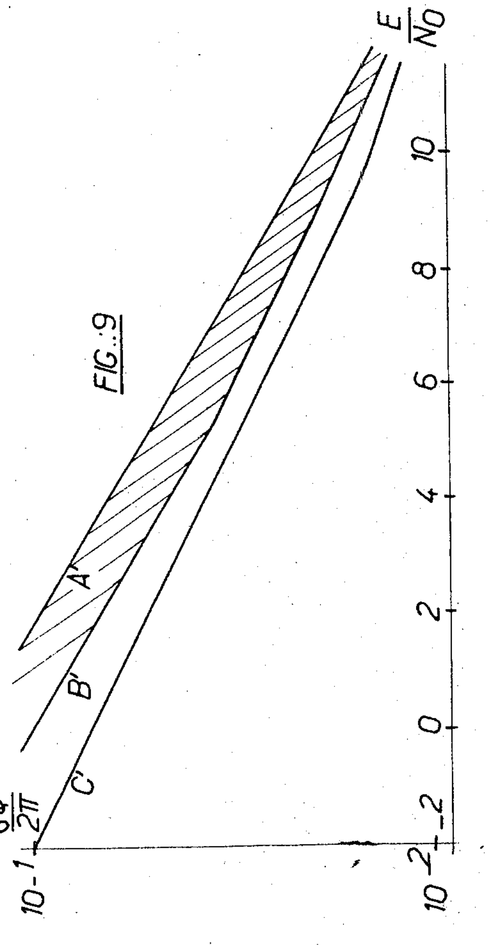
FIG. 9 shows some experimental values for the variance in phase, compared with the theoretical curve.

For the phase variance (where $\beta = 4/\pi 2$), there were obtained values which were contained in the shaded band illustrated in FIG. 9 between the curves A' and B', the curve C' being the theoretical curve. The experimental curve Ex showing the probability of bit error is given by FIG. 10; it will be seen that it is very close to the theoretical curve T*h*.

Figure 12:
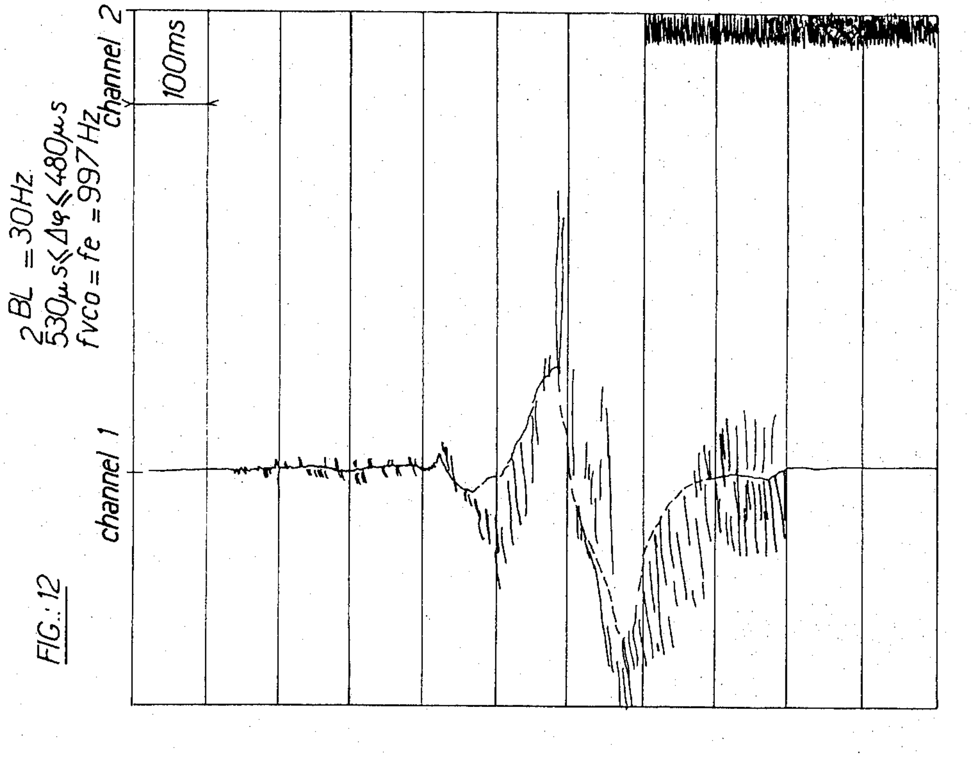
FIGS. 11 and 12 are reproductions of graphic recordings of transient phase errors.
Figure 11:
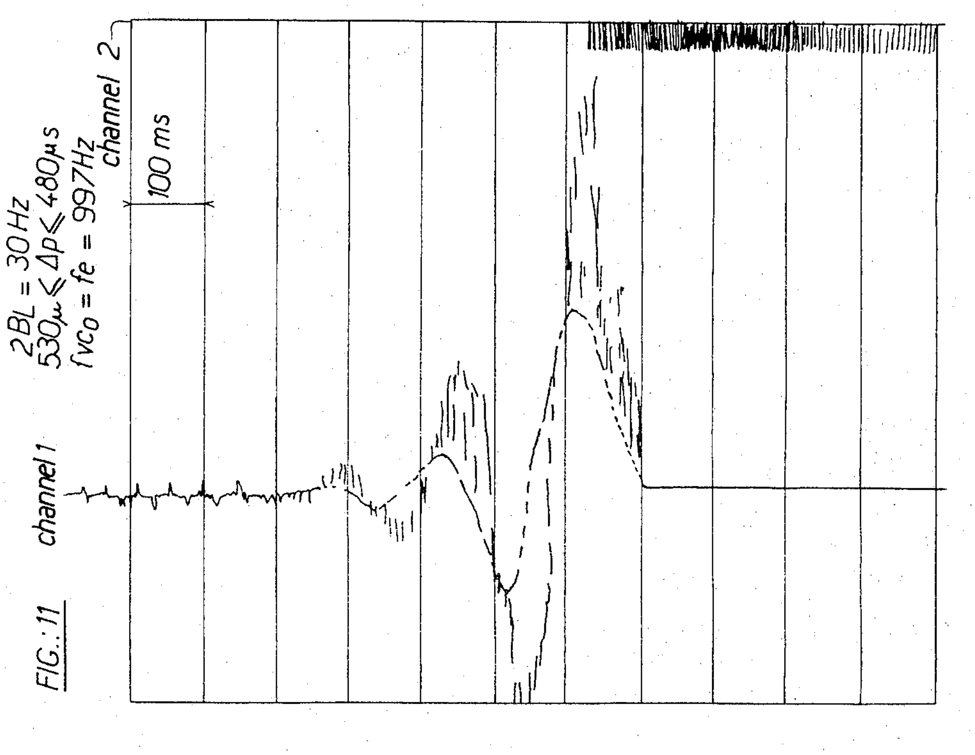

FIGS. 11 and 12 reproduce graphic recordings which were taken and which give the transient phase errors.

On analysing the recordings it becomes apparent that the phase acquisition time is less than, or equal to, 200 ms, which remains in keeping with the theoretical formula.

These results, which are excellent from the point of view of functioning, obtained from the decommutation device according to the invention, are attributable to the combination of a number of factors, which all tend to avoid losses of energy from the useful data signals:

in the first place, to the choice of the type of structure, with a single phase comparator and without an auxiliary input device;

in the second place, to its construction in two parts, of which one stores while the other integrates, and vice versa;

in the third place, to suitable selection of the moments and duration of integration, and of their mutual overlap (equal to $T/2$) in a pair of chains;

in the fourth place, to the system of commutation and to the selection of the moments in which it functions;

and, finally, to proper manufacture of the circuits and their elements.

The basic device according to the invention, as shown in FIG. 2, is suitable, without modification or addition, for decommutating PCM signals coded in NRZ or two-phase form.

It will be noted that, for the purpose of decommutating NRZ signals, the multipliers $M_1$ and $M_2$ which are required under two-phase conditions, may be omitted.

Figure 13A:
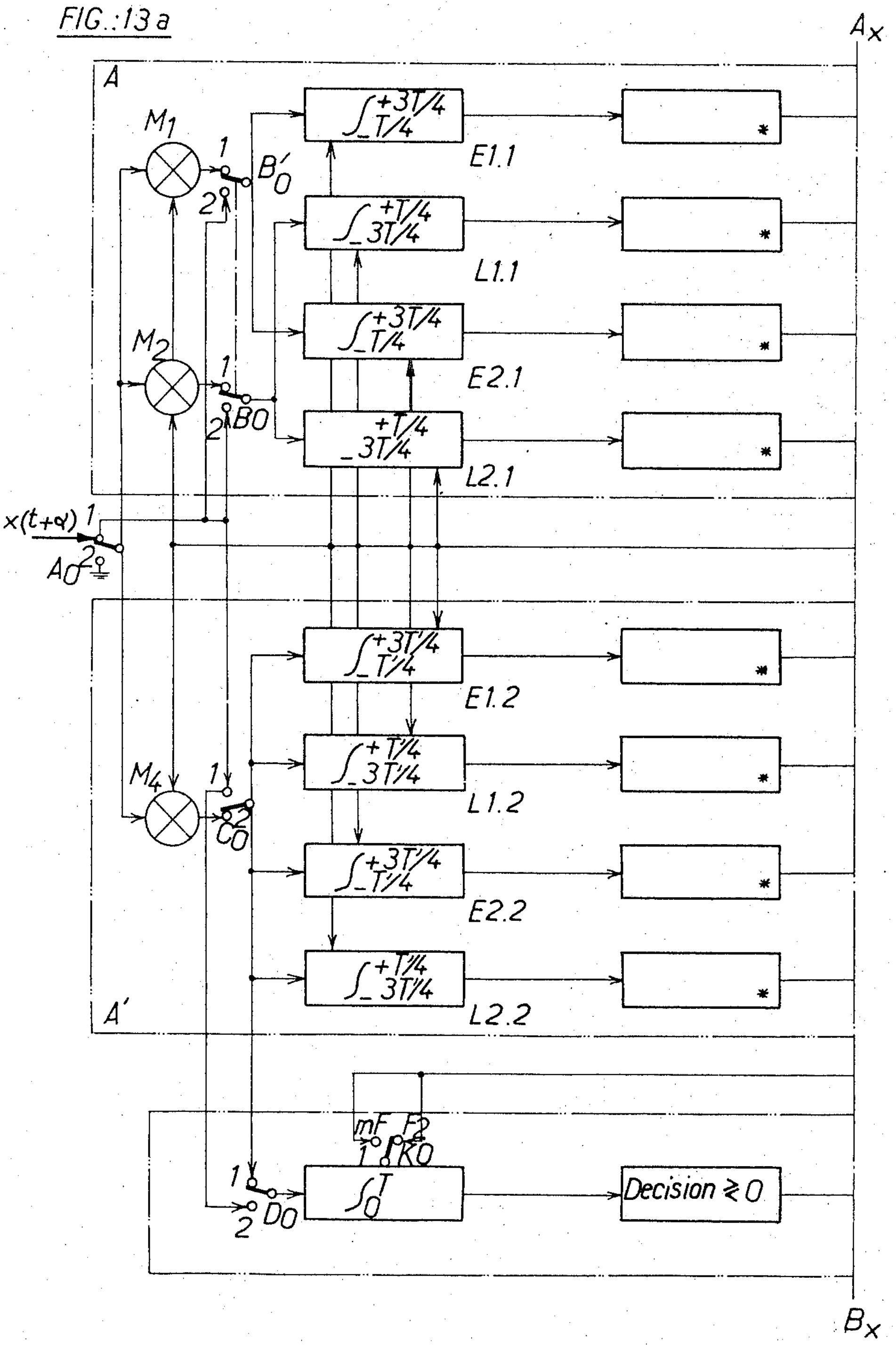
FIG. 13 (which is divided into two FIGS., 13*a* and 13*b*) is a block diagram showing the principle of a PSK synchronizer.
Figures 13, 13B:
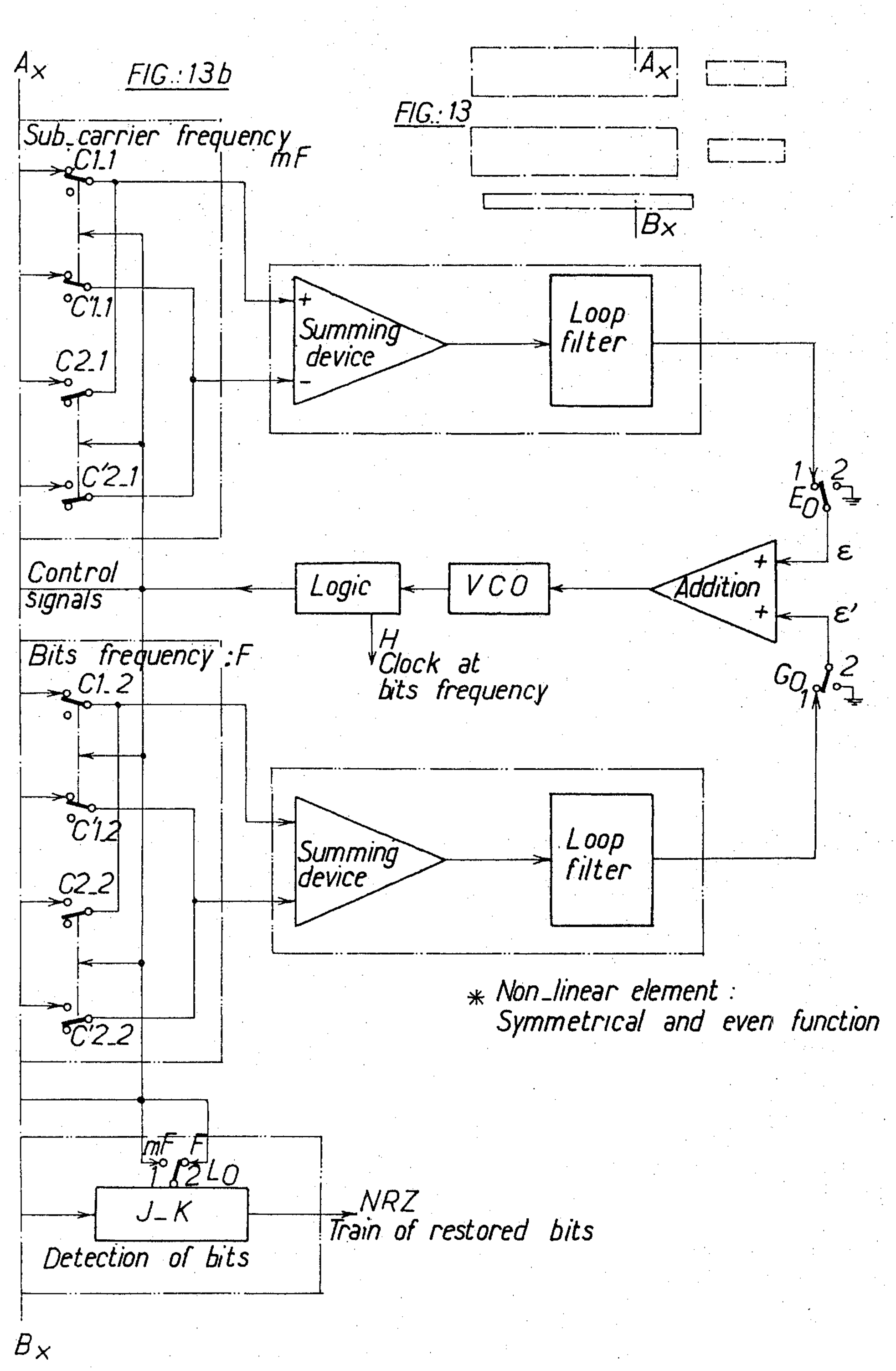

In order to decommutate signals which are coded in PSK, the diagram in FIG. 2, that is to say part A, will be supplemented by a part A', as shown in FIG. 13, the whole arrangement functioning at the sub-carrier frequency ($T' = mT$). The part A', which is similar to A, is therefore also a phase comparator according to the invention, which is made up of 4 E and L chains. This comparator supplies a phase error signal $\epsilon'$ controlling the VCO, after addition to the error voltage $\epsilon$ supplied by the part A which works at the bit frequency.

Figure 14:
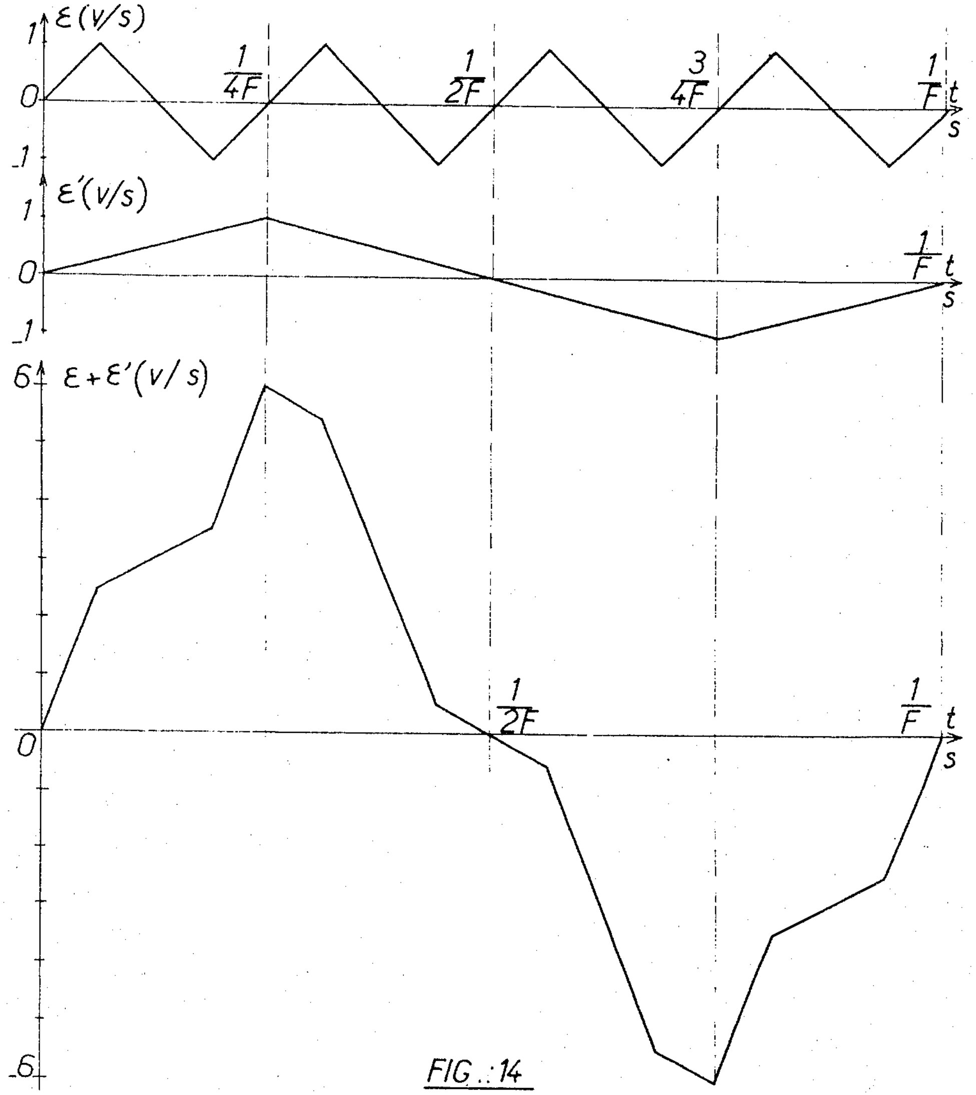
FIG. 14 gives the corresponding phase error characteristic.

This device makes it possible to decommutate PSK signals whatever the ratio $m$ between the sub-carrier frequency $mF$ and the bit frequency $F$ ($m$ being a positive whole number), provided that conditions of the following type relating to the continuous gains of the parts A and A' are fulfilled:

the gain of A' is at least $m$ times the gain of A. FIG. 14 illustrates the appearance of the phase error characteristic ($\epsilon + \epsilon'$), in a case where:

$m = 4$ gain of A' = 6 times the gain of A characteristic of the non-linear elements of the type $y = x^2$.

This structure has the advantage of functioning, not only under PSK conditions, but also with a sub-carrier which is modulated under NRZ or two-phase conditions, at a cadence which is a sub-multiple of that of the rhythm of the data digits and provided that the positions of the contacts of the commutators are modified according to the specifications given below:

| | | | |
|---|---|---|---|
| Functioning under NRZ conditions, at the frequency F: | | | |
| Switch | Ao | in position | 1 |
| do. | Bo–B'o | do. | 2 |
| do. | Co | do. | 1 |
| do. | Do | do. | 2 |
| Switch | Lo | in position | 2 |
| do. | Ko | do. | 2 |
| do. | Eo | do. | 2 |
| do. | Go | do. | 1 |
| Functioning under NRZ conditions, at the frequency mF: | | | |
| Switch | Ao | in position | 1 |
| do. | Bo–B'O | do. | 1 |
| do. | Co | do. | 1 |
| do. | Do | do. | 2 |
| do. | Lo | do. | 1 |
| do. | Ko | do. | 1 |
| do. | Eo | do. | 1 |
| do. | Go | do. | 2 |
| Functioning under two-phase conditions, at the frequency mF: | | | |
| Switch | Ao | in position | 1 |
| do. | Bo–B'O | do. | 1 |
| do. | Co | do. | 2 |
| do. | Do | do. | 1 |
| do. | Lo | do. | 1 |
| do. | Ko | do. | 1 |
| do. | Eo | do. | 1 |
| do. | Go | do. | 2 |
| Functioning under PSK conditions (mF/F): | | | |
| Switch | Ao | in position | 1 |
| do. | Bo–B'O | do. | 1 |
| do. | Co | do. | 2 |
| do. | Do | do. | 1 |
| do. | Lo | do. | 2 |
| do. | Ko | do. | 2 |
| do. | Eo | do. | 1 |
| do. | Go | do. | 1 |

It will be noted that it is possible to operate under two-phase conditions at a cadence of $F$, on condition that the multiplier M4 is supplemented by another multiplier in part A'. In this event, the parts A and A' are absolutely identical from the functional point of view. (This has not been shown in the diagram in FIG. 13).

For the purpose of completeness, certain other details concerning the construction of these devices will be given.

The commutators are preferably of the electronic type.

Figure 15:
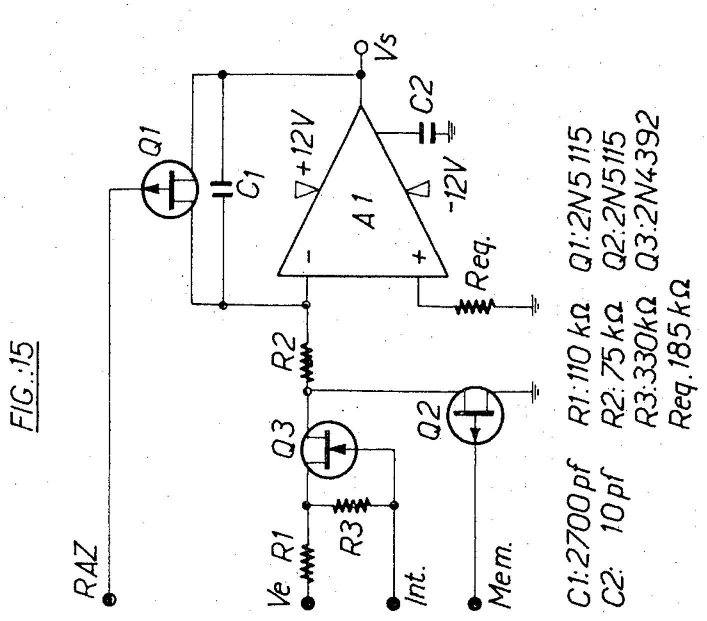
FIG. 15 is the application diagram of an integrating amplifier.

The integrators are advantageously constructed as shown by the diagram in FIG. 15, with the accompanying values. $A_1$ designates an amplifier which is constructed in the form of a standard integrated circuit. RAZ is the arrangement for resetting to zero. V*e* is connected to the input voltage, and the terminals Int. and Mem. are respectively connected to an integrator and to a means functioning as a memory (another integrator).

Figure 16:
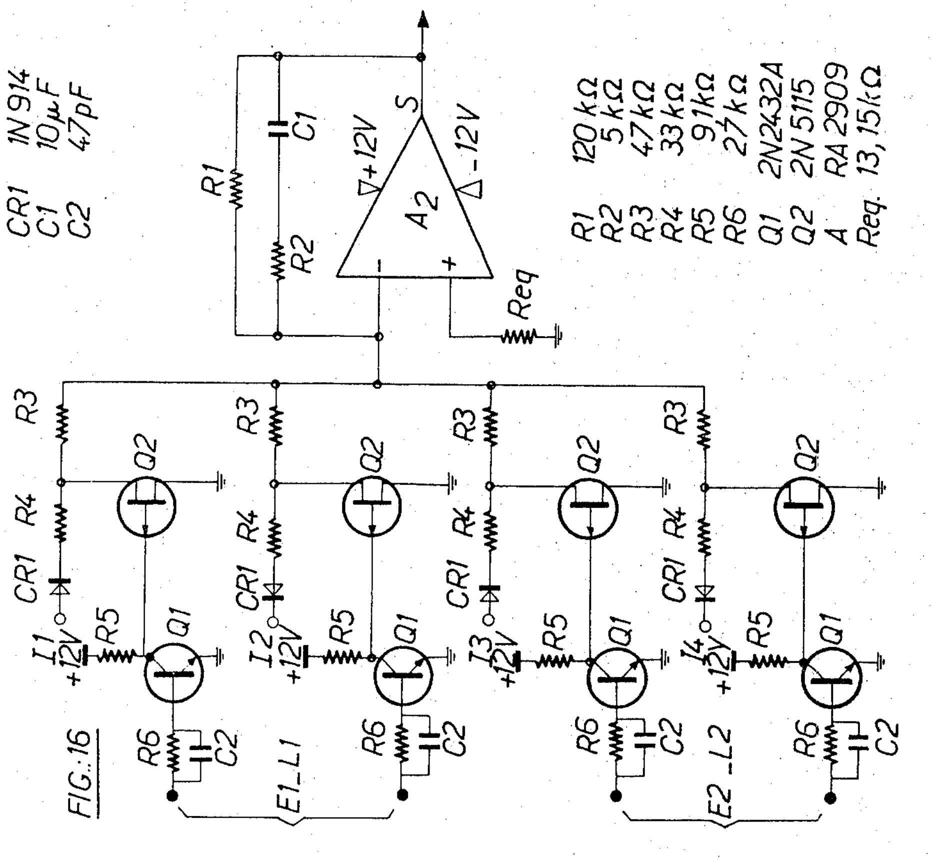
FIG. 16 is the possible application diagram of a summation device.

FIG. 16 shows how to set up the actuation arrangement for the summing device. $A_2$ here designates an ordinary asymmetrical amplifier in integrated-circuit form, which is not a differential amplifier as the preceding theoretical diagrams (FIGS. 2 and 13) might make it seem. One of the input terminals of the amplifier is, in fact, connected to earth by the resistance Req. A single terminal of the amplifier is therefore actuated by signals of suitable polarity. The signals which originate from the integrators and have passed through the non-linear elements, are applied to the bases of the transistors $Q_1$. The field-effect transistors $Q_2$ act as switches under the effect of the local clock signals applied at $I_1$, $I_2$, $I_3$, $I_4$. FIG. 16 is accompanied by the values of the elements.

It is self-evident that the methods of embodiment described are only examples and that it would be possible to modify them, particularly by the substitution of technical equivalents, without thereby departing from the scope of the invention.

The advantages of the device or devices of the invention are many:

a. on the one hand, from the point of view of physical construction:
- simplicity of the circuits and reliability;
- adjustments reduced to the minimum (these occur only during preparation;
- the possibility of robust construction and good behaviour in respect of temperature;
- low weight, consumption and bulk;
- construction involving a large number of standard elements and a number of identical chains; maintenance is facilitated because the elements are interchangeable;
- the possibility of construction both as a very high efficiency and light design for ballistic missiles, and as a heavier piece of apparatus having a very large number of possibilities and remaining on the ground;

b. on the other hand, from the functioning and circuits point of view:
- an efficiency which is very close to the theoretical maximum efficiency; good performance under noisy conditions; the equivalent band of the loop is the largest possible one in order to facilitate the acquisition of the synchronization;
- the elimination of phase ambiguity at the output is automatic and devoid of any supplementary means, in the case of all codes;
- "universal" device to the extent that it is suitable for the optimum codes used (NRZ, two-phase, etc.);
- it is easily possible to achieve a variable ratio between the sub-carrier frequency and the bit frequency; once this ratio has been fixed, it can easily be modified by connection to one or other of the division stages, starting from the clock signal;

a device according to the invention accepts any kind of input signal whatsoever, that is to say that, in contrast to many of the known devices, no limiter or specially designed filter is necessary at the input, and the very most that is recommended is that there should be a variable-gain amplifier, with a completely ordinary filter, in order to protect the first input components and to avoid loading them with interference to no purpose;

it uses a single phase loop on the bit rhythm, in conjunction with a phase comparator on the sub-carrier rhythm, under PSK functioning conditions, and a phase comparator on the binary rhythm in the other modulations;

it is capable of working (less well) with only half of the phase comparator;

it is possible to pass from one mode (NRZ, two-phase, PSK) to another by simple commutation and without any difficulty, and also to change cadence;

the phase loop on the bit rhythm remains locked, even if there is no bit change in the input message in two-phase configuration, and above all under PSK conditions which is not true of any other similar known device.

What is claimed is:

1. A device for the decommutation of a random message of PCM type, supplemented by thermal noise, which device extracts the data in a digitalized form, by controlling a bits detector, without having available any external clock signals, the said device comprising, for this purpose, an oscillator and at least one phase comparator including a pair of chains which are fed in parallel by the message, each of said chains comprising, in series, an integrator and a non-linear element, the integrators each functioning for a duration which is equal to one clock period, with partial overlapping of said durations, and the said phase comparator comprising commutation means controlled by locally recreated clock signals and functioning at a frequency which is a submultiple of that of the said clock signals, for the purpose of taking out the signals, which are formed by the integrators in an interval of time comprising a whole number of clock periods, and are stored for a succeeding and equal interval of time, with a view to producing by differentiation, as is known per se, error signals controlling said oscillator, which generates the said local clock signals, acting upon the phase comparator and said bits detector.

2. A decommutation device as claimed in claim 1, in which said phase comparator comprises two pairs of chains, one of said pair of chains serving to reset the integrators to zero and then to integrate the input signals, and the other pair of chains serving to store the data obtained in the course of the integration process in the preceding interval of time, and said pairs of chains exchanging their roles at the end of a said interval of time, this process continuing in a periodic manner.

3. A decommutation device as claimed in claim 1, comprising means for forming error signals and discharging them at the output of the phase comparator, at the same time as resetting of the integrators to zero is being effected.

4. A decommutation device as claimed in claim 1, in which the respective integrating operations in the two chains of the pair are effected with a time overlap which is equal to $T/2$.

5. A decommutation device as claims in claim 1, adapted to function under numerical conditions, in which each of the said integrators is a summing device and each non-linear element is of the "module" type.

6. A decommutation device as claimed in claim 1, in which the said non-linear elements are formed by diodes which are connected in opposite directions in the two chains of the pair.

7. A decommutation device as claimed in claim 1, in which the means located at the output of a pair of chains for the purpose of performing differentiation between the signals received, with a view to producing the error signals, is an asymmetrical amplifier having one live input terminal which receives signals of suitable polarity.

8. A decommutation device as claimed in claim 1, in which said phase comparator includes at least one input-multiplying means controlled by said clock signals.

9. A device for the decommutation of an item of information conveyed by a sub-carrier, with a frequency which is a sub-multiple of that of the rhythm of the data bits which modulate the said sub-carrier, the said device comprising a first phase comparator including two pairs of chains which are fed in parallel by the signal of the modulated sub-carrier, each of the said chains comprising, in series, an integrator and a non-linear element, the said integrators each functioning for a duration which is equal to one clock period of the bits, with partial overlapping of these durations, and commutation means which are controlled by the said locally recreated clock signals, in such a way that the said first comparator functions at the rhythm of the said bits, each of the said pairs functioning alternately and effecting delivery to a summing device; a second phase comparator including two pairs of chains which are fed in parallel by the signal of the modulated subcarrier, each of the said chains comprising, in series, an integrator and a non-linear element, the said integrators each functioning for a duration which is equal to one clock period of the sub-carrier, with partial overlapping of these durations, and commutation means which are controlled by the locally recreated clock signals, each of the said pairs functioning alternately and effecting delivery to a summing device, in such a way that the said second comparator functions at the frequency of the sub-carrier; an adding device, the two inputs of which are provided with connections to the respective outputs of each comparator via a filter, the input of which is connected to the output of the summing device, a local oscillator connected to the output of the adding device in order to be monitored by voltage, an intermediate logic connected to the oscillator and to the two comparators in order to act upon the latter; and bits detector connected to the intermediate logic, producing the decommutated signal.

10. A decommutation device as claimed in claim 9, in which each of the said comparators incorporates at least one input-multiplying means controlled by said clock signals.

11. A decommutation device as claimed in claim 9, comprising a group of commutation means which can be manoeuvred in order to achieve connections of the chains which correspond to the processing of messages transmitted in a different manner, for example in PSK form at the frequency $m$ $F$, in NRZ form at the frequency $F$, NRZ form at the frequency $m$ $F$, or in two-phase form at the frequency $p$ $F$, where $F$ is the frequency of the bits, and $m$ and $p$ are whole multiplying numbers.

* * * * *